US006279597B1

United States Patent
Schulze

(10) Patent No.: US 6,279,597 B1
(45) Date of Patent: Aug. 28, 2001

(54) THERMAL SAFETY VALVE FOR AUTOMATICALLY SHUTTING OFF PIPES

(75) Inventor: Klaus Schulze, Gernrode (DE)

(73) Assignee: Mertik Maxitrol GmbH & Co., KG

( * ) Notice: Subject to any disclaimer, the term of this patent is extended or adjusted under 35 U.S.C. 154(b) by 0 days.

(21) Appl. No.: 09/623,724

(22) PCT Filed: Feb. 17, 1999

(86) PCT No.: PCT/EP99/01035
§ 371 Date: Sep. 1, 2000
§ 102(e) Date: Sep. 1, 2000

(87) PCT Pub. No.: WO99/46527
PCT Pub. Date: Sep. 16, 1999

(30) Foreign Application Priority Data

Mar. 10, 1998 (DE) .............................................. 198 10 223

(51) Int. Cl.$^7$ .................................................. F16K 17/38
(52) U.S. Cl. .................................. 137/75; 137/72; 137/79
(58) Field of Search ................................ 137/72, 74, 75, 137/79

(56) References Cited

U.S. PATENT DOCUMENTS

| 1,022,119 | * | 4/1912 | Barton ..................................... 137/75 |
| 1,243,998 | * | 10/1917 | Smyly ..................................... 137/75 |
| 2,707,965 |   | 5/1955 | Allen . |
| 3,720,220 |   | 3/1973 | McMath . |
| 4,488,566 |   | 12/1984 | Hicks . |
| 4,890,635 |   | 1/1990 | Gray, Jr. . |
| 5,743,285 | * | 4/1998 | Shalkevich ......................... 137/79 X |
| 5,836,338 |   | 11/1998 | Schulze . |
| 5,950,656 |   | 9/1999 | Schulze . |
| 6,019,119 |   | 2/2000 | Schulze . |

FOREIGN PATENT DOCUMENTS

| 1 019 879 | 11/1957 | (DE) . |
| 1 429 056 | 6/1970 | (DE) . |
| 39 16 100 A1 | 11/1990 | (DE) . |
| G 90 17 534.4 | 3/1991 | (DE) . |
| 0 118 152 | 9/1984 | (EP) . |
| 0 343 615 B1 | 11/1989 | (EP) . |
| 0 364 906 A2 | 4/1990 | (EP) . |
| 0 574 677 A1 | 12/1993 | (EP) . |
| 0 605 551 B1 | 7/1994 | (EP) . |
| 536051 | 5/1941 | (GB) . |
| 549406 | 11/1942 | (GB) . |

* cited by examiner

Primary Examiner—John Rivell
(74) Attorney, Agent, or Firm—Harness, Dickey & Pierce, P.L.C.

(57) ABSTRACT

Inside the casing (1), there are three or more ribs (8) arranged with their longitudinal axes parallel to the closing body's direction of movement when closing so that each rib forms a slide-way for the closing body (5) moving from open into closed position. Into each of these ribs there is cut a first groove (10) in which is placed a shaped part (11) that supports the closing spring (9). At least the ribs arranged approximately opposite to the tappet (20) have a second groove whose side facing the seat (7) forms a rest edge (18) on which the control edge may rest when the closing body is in open position. When the fusible soft solder component (21) is melting away, the tappet changes its position in axial direction under the force exercised by the closing spring. Due to this change of position, the control edge is no longer resting on the rest edge, and the closing body driven by the dosing spring switches over into its close position.

21 Claims, 2 Drawing Sheets

THERMAL SAFETY VALVE FOR AUTOMATICALLY SHUTTING OFF PIPES

BACKGROUND AND SUMMARY OF THE INVENTION

The invention concerns a thermally triggered safety device to automatically shut off the fluid in pipelines, especially gas pipelines, in case of impermissible temperature rises, according to the conception of the species of the $1^{st}$ patent claim.

Thermally triggered safety devices as mounted on pipelines, for example, upstream to gas fittings, gas appliances, gas meters, etc., are found in a great number of different designs. They all serve to shut off the gas in case of rising temperature well before the temperature at such gas fitting, appliance, or meter, may become high enough to jeopardize its tightness against the environment.

One of such thermally triggered safety device, as described above, is specified in DE 44 22 241 A1. In this solution, a closing body, situated inside the casing in axial direction opposite to an in-built seat, is kept in open position by one or more nearly U-shaped structural parts. To serve as such, the closing body has—right behind the sealing face which is directed towards the seat—a necking on the closing body's side opposite to the seat, followed by a collar of preferably cylindrical shape. The two limbs of the U-shaped part are located around the necking, in this way supporting the collar to withstand the forces exercised by the closing spring. Furthermore, the U-shaped part's section that connects the two limbs rests on a fusible soft solder component which in turn rests on the inner surface of the casing wall. If said fusible soft solder component melts off, the U-shaped part's limbs—as they move out of their original position relative to the casing—are no longer located around the closing body's necking so that the latter is allowed to being pushed by the closing spring into its close position. At the same time, the two limbs are forming a slide-way to guide the collar and/or the sealing face of the losing body towards the seat.

The above solution's disadvantage is the fact that—in addition to the closing body itself—there is a lot of other things built in the casing, in most cases being situated within the closing body flow cross—section. In order to achieve the flow rates specified in standards, or desired in praxi, you have to determine the fitting size correspondingly. This, in turn, entails noncompliance with other—required and/or desired—fitting sizes.

Also known from EP—PS 605 551 is a so-called "fire valve", equipped with a closing spring, to be mounted on pipelines as an automatic shut-off device. Inside this fire valve, in a separate casing, there is a metal closing body, with a ball-shaped sealing face, which—in open position, under the force exercised by a closing spring—rests on three fix points formed by two balls and one temperature-sensitive structural part. The two balls, which in turn rest on a shoulder situated inside the casing, are located in such a distance to each other to form an approach angle of approx. 90 degrees. Opposite to this approach angle, fixed to the inside wall of the casing, there is the temperature-sensitive structural part.

The latter comprises an inward open tray, the bottom of which is fixed to the inner wall. A fusible soft solder component is placed inside the inward radially open tray into which is pressed a ball that snugly fits to the tray's opening, in this way forming the third fix point, and—in case of no longer existing fusible soft solder component—would be nearly completely taken up by the tray. The diameter of the area of support formed by these three fix points is calculated so that the closing body, with the ball being taken up by the tray, will be pushed under the force exercised by the spring through the enlarged opening formed by the three fix points.

As can be clearly seen from the corresponding FIG. N° 1, the disadvantage of this solution is the fact that the closing body, resting in an open out-of-center position, is not axially guided when moving into its close position. Due to existing tolerances the forces of closing spring will never be acting perfectly in axial direction and, therefore, lateral excursions of the ball occur when it moves into its close position. This naturally leads to a lateral impact, requiring an extra movement to be seated into center position, that consumes part of the kinetic energy which is needed to achieve a proper press fit. Such press fit, however, is required in any case to make sure that the thermally triggered safety device will be effective even at temperatures at which the closing spring will already have lost its pressing power.

The invention focuses on the problem of developing a thermally triggered safety device as described above, which makes sure that the closing body is axially guided when moving into its close position. In addition, said thermally triggered safety device should have a largely undisturbed ring cross-section. Also, production cost and fitting size should be kept at a minimum.

According to the invention, the problem is solved by arranging three or more solid ribs inside the casing in such a way that their longitudinal axes are parallel to the direction of the closing body's movement into close position so that each of these ribs form a slide-way to guide the closing body in its movement from open into close position. Also, a first groove is cut into these ribs to take up a shaped part on which the closing spring rests. At least the ribs arranged approximately opposite to the tappet have a second groove, whose seat-facing side forms a rest edge for the control edge at the closing body in its open position. If the fusible soft solder component melts off, the tappet changes its position in axial direction under the force exercised by the closing spring. Due to the change in the tappet's position, the control edge is no longer sitting dose to the rest edge, and the closing body, driven by the closing spring's action, moves into its close position.

The above solution, hence, removes the prior art's disadvantages, i.e. firstly, there were too many things, besides the closing body, built in the casing, in most cases situated even within the closing body flow cross-section, and secondly, the closing movements were not perfectly axial. In addition, this solution is distinguished above all by its simplicity and small fitting size, the latter being of special interest with greater nominal widths.

Other advantageous features of the invention are defined in the patent claims. The rest edge, for example, may be integrated into the first groove's lateral edge that faces the seat so that the manufacturing costs can be minimized further, and/or the tappet may rest in one of the solid ribs, etc.

In order to have an optimum flow cross-section design, it is advisable to make the solid ribs from section rods supported both around the seat and near the casing's entrance area.

Manufacturing-wise, it is particularly advantageous to form the solid ribs from fins which are connected with the casing in form of a single-piece casting.

To simplify assembling activities, above all, the shaped part may be designed in such a way that it can be twisted inside the groove, and an individual curved path located on said shaped part is assigned to each single rib. The minimum distance of this curved path to the shaped part's center is less than half the diameter created by the rib edges alongside the casing's longitudinal axis, whereas the maximum distance of this curved path to the shaped part's center nearly equals the distance between the groove's bottom and the casing's longitudinal axis. As an addition, a peg may be fixed in said distance to limit the curved path and the shaped body's twisting movement inside the groove, with the rib acting as a limit stop.

BRIEF DESCRIPTION OF THE DRAWINGS

The invention is further detailed in the practical example below.

DESCRIPTION OF THE PREFERRED EMBODIMENT

Figure 1:
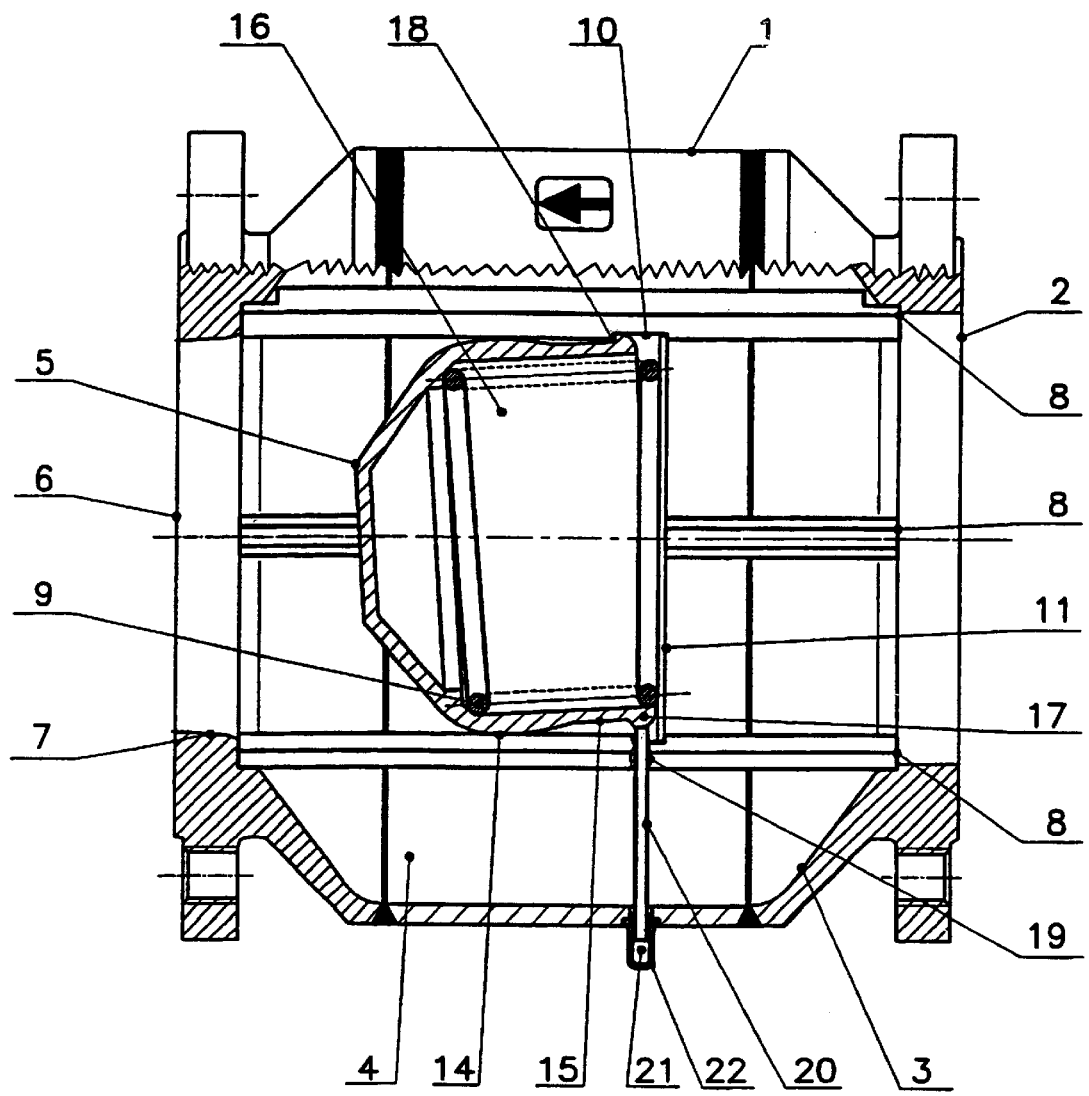
FIG. 1 shows a sectional view of the thermally triggered safety device according to the invention, in open position

The thermally triggered safety device according to the invention, as further detailed below and shown in FIG. 1, has a tubular casing (1) that is equipped with fittings on each ends, in this example being flanged connections. It goes without saying that any other connection type would do as well. Both flanged joints are connected gas-tight to the casing (1).

The admission port (2) is followed by an expansion (3), made for fluidic reasons, which in turn passes into the tubular area (4) of the casing (1). The expansion's (3) contour is adjusted to the contour of a closing body (5), which is further detailed below, in such a way to guarantee optimum flow characteristics. The expansion (3) is followed by the seat (7) that is situated before the delivery port (6).

In this practical example, the tubular area (4) houses four section rods (8) arranged so that their longitudinal axes lay parallel to the casing's (1) longitudinal axis. These section rods (8) are supported both near the seat (7) and near the admission port (2), where they are rigidly fixed in their supports, preferably by welding, for prefabrication reasons to prevent them from being displaced in any way. The distance from the section rods (8) to the casing's longitudinal axis is designed so that a cylindrical closing body (5), which is further detailed below, can be guided during its moving in longitudinal direction within the casing (1).

Figure 2:
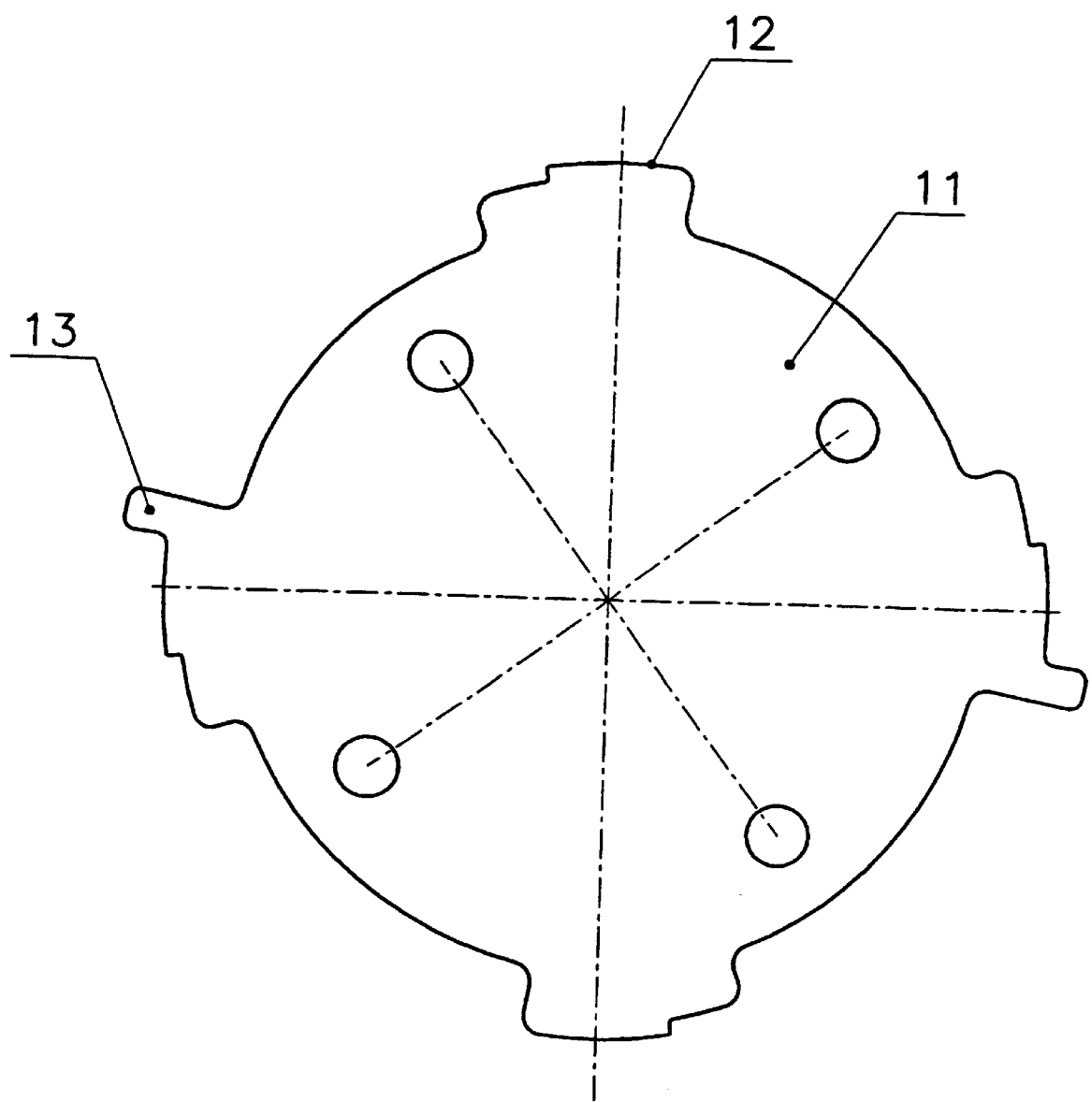
FIG. 2 shows a separate depiction of the shaped part in one of its possible designs in accordance with the present invention.

In each section rod (8) is cut a groove (10) to take up a shaped part (11), preferably made of sheet metal, as depicted in FIG. 2. In one of the section rods (8), the groove's (10) lateral side that faces the seat (7) forms a rest edge (18). The section rod (8) laying opposite to the section rod (8) that bears this rest edge (18) has—opposite to the groove (10) area—a transversal bore (19) whose longitudinal axis forms a right angle with the casing's longitudinal axis.

As can be seen from FIG. 2, each section rod (8) is assigned on the shaped part (11) a certain curved path (12) that is dimensioned in such a way that its minimum distance to the center of the shaped part (11) is less than half the diameter formed by the section rods' (8) edges facing the casing's longitudinal axis, whereas the maximum distance of the curved path (12) is approximately the distance between the bottom of the groove (10) cut into the section rod (8) and the casing's longitudinal axis. As an addition, a peg (13) is fixed—in this example—on two opposite curved paths (12) in said maximum distance to limit the curved path (12) and the shaped body's (11) twisting movement inside the grooves (10), with the corresponding section rod (8) acting as a limit stop.

In this practical example, the closing body (5) mentioned above has a ball-shaped sealing area (14), tapered for fluidic reasons towards the delivery port (6). Towards the admission port (2), the ball-shaped sealing area (14) is followed by a necking (15) the outside diameter of which is significantly smaller than the diameter of the seat (7). At the closing body's (5) end facing the admission port, the closing body has a circumferential collar (17), which is connected to the necking (15), favorably via a bevel acting as a control edge. The closing body (5) has on its front side, facing the admission port (2), a pocket hole (16), that houses a closing spring (9) which—when under tension, i.e., in the safety device's open position—is sitting to a great extent inside said pocket hole. The closing spring (9) rests—on the one side—on the pocket hole's bottom, whereas its other end is in contact with the shaped part (11). In said open position, the closing body (5) is resting—through its control edge at the collar (17)—on the rest edge (18), too.

The tappet (20) of a sensor element rests with its face side on the closing body's (5) surface around the collar (17), whilst its backside rests on a fusible soft solder component (21). The fusible soft solder component (21) is favorably placed in a tray (22), which stands proud of the casing (1) to guarantee the shortest possible response time. In this context, the total length of the sensor element is sized so that the closing body (5) is shifted by the tappet (20) in an out-of-center position to such an extent that the control edge under the force exercised by the closing spring (9)—as already explained above—sits close to the rest edge (18).

The thermally triggered safety device according to the invention is functioning as follows:

In the event of an impermissible increase of temperature the fusible soft solder components (21) happens to melt off, which allows the tappet (20), under the force exercised by the closing spring (9), to be pushed into the tray (22). Due to this change of the tappet's (20) position the control edge slides off from the rest edge (18), and the closing body's (5) ball-shaped sealing area (14) is forced by the closing spring (9) into the seat (7).

In its closing movement, the closing body (5) is axially guided by the section rods (8) so that radial deviations in the closing body's (5) movement, with possible impediments to the sealing efficiency occurring as a consequence, are prevented.

It goes without saying that the safety device according to the invention is not at all restricted to the practical example as described above. On the contrary, changes and modifications are possible without going beyond the area covered by this invention. So, for instance, the joints represented by flanged connections in this example may be have female or male threads. Also, the sealing area (14) can be cone-shaped instead of being ball-shaped.

What is claimed is:

1. A thermally triggered safety device to automatically shut off the fluid in pipelines, especially gas pipelines, in case of impermissible temperature rises, a casing (1) of which has an integrated seat (7) and a metal closing body (5), that is located in axial extension to said seat (7) and which has a sealing area (14) facing said seat (7), followed by a necking (15) on said closing body's side opposite to said seat, and a collar (17) that forms a control edge, by which said closing body (5) is kept in an open position under the force exercised in a closing direction by a closing spring (9), which spring is under tension and is sitting to a great extent inside a pocket hole (16), provided in said body by means of a tappet (20) whose one end rests on a fusible soft solder component (21), and the other end engages the closing body's (5) surface near the collar (17), CHARACTERIZED IN THAT inside said casing (1), three or more ribs (8) are arranged with their longitudinal axes parallel to said closing body's (5) direction of movement when closing so that each of said ribs (8) forms a slide-way for said closing body (5) moving from an open into a closed position, and there is cut into each of said ribs (8) a first groove (10) in which is placed a shaped part (11) that supports said closing spring (9), and at least said ribs (8) arranged approximately opposite to said tappet (20) have a second groove whose side facing said seat (7) forms a rest edge (18) on which said collar's (17) control edge may rest when said closing body (5) is in open position, whereas in case of melting away said fusible soft solder component (21), and the change of said tappet's (20) position as a consequence of said melting off, said control edge does no longer rest on said rest edge (18), and said closing body (5), driven by said closing spring (9) switches over into its closed position.

2. A thermally triggered safety device to automatically shut off the fluid in pipelines according to claim 1, CHARACTERIZED IN THAT said rest edge (18), which supports said control edge, is integrated into the first groove's (10) lateral edge that faces said seat (7).

3. A thermally triggered safety device to automatically shut off the fluid in pipelines according to claim 1, CHARACTERIZED IN THAT said tappet (20) is placed inside one of said ribs (8).

4. A thermally triggered safety device to automatically shut off the fluid in pipelines according to claim 1, CHARACTERIZED IN THAT the ribs (8) are formed by section rods (8) that are supported both around the seat (7) and near the casing's (1) entrance area.

5. A thermally triggered safety device to automatically shut off the fluid in pipelines according to claim 1, CHARACTERIZED IN THAT said ribs (8) are formed by fins which are connected with said casing (1) in form of a single-piece casting.

6. A thermally triggered safety device to automatically shut off the fluid in pipelines according to claim 1, CHARACTERIZED IN THAT said shaped part (11) is designed in a way that said shaped part's (11) twisting inside said first groove (10) is enabled, and an individual curved path (12) located on said shaped part (11) is assigned to each single rib (8), and the minimum distance between said curved path and said shaped part's (11) center is less than half the diameter created by said ribs' (8) edges alongside said casing's longitudinal axis, whereas the maximum distance between said curved path (12) and said shaped part's center nearly equals the distance between said groove's bottom and said casing's longitudinal axis.

7. A thermally triggered safety device to automatically shut off the fluid in pipelines according to claim 6, CHARACTERIZED IN THAT in said maximum distance a peg (13) may be fixed to limit the curved path (12) and said shaped body's (11) twisting movement inside said groove (10), with said rib (8) acting as a limit stop.

8. A thermally triggered safety device to automatically shut off the fluid in pipelines according to claim 2, CHARACTERIZED IN THAT said tappet (20) is placed inside one of said ribs (8).

9. A thermally triggered safety device to automatically shut off the fluid in pipelines according to claim 2, CHARACTERIZED IN THAT the ribs (8) are formed by section rods (8) that are supported both around the seat (7) and near the casing's (1) entrance area.

10. A thermally triggered safety device to automatically shut off the fluid in pipelines according to claim 3, CHARACTERIZED IN THAT the ribs (8) are formed by section rods (8) that are supported both around the seat (7) and near the casing's (1) entrance area.

11. A thermally triggered safety device to automatically shut off the fluid in pipelines according to claim 8, CHARACTERIZED IN THAT the ribs (8) are formed by section rods (8) that are supported both around the seat (7) and near the casing's (1) entrance area.

12. A thermally triggered safety device to automatically shut off the fluid in pipelines according to claim 2, CHARACTERIZED IN THAT said ribs (8) are formed by fins which are connected with said casing (1) in form of a single-piece casting.

13. A thermally triggered safety device to automatically shut off the fluid in pipelines according to claim 3, CHARACTERIZED IN THAT said ribs (8) are formed by fins which are connected with said casing (1) in form of a single-piece casting.

14. A thermally triggered safety device to automatically shut off the fluid in pipelines according to claim 4, CHARACTERIZED IN THAT said ribs (8) are formed by fins which are connected with said casing (1) in form of a single-piece casting.

15. A thermally triggered safety device to automatically shut off the fluid in pipelines according to claim 8, CHARACTERIZED IN THAT said ribs (8) are formed by fins which are connected with said casing (1) in form of a single-piece casting.

16. A thermally triggered safety device to automatically shut off the fluid in pipelines according to claim 2, CHARACTERIZED IN THAT said shaped part (11) is designed in a way that said shaped part's (11) twisting inside said first groove (10) is enabled, and an individual curved path (12) located on said shaped part (11) is assigned to each single rib (8), and the minimum distance between said curved path and said shaped part's (11) center is less than half the diameter created by said ribs' (8) edges alongside said casing's longitudinal axis, whereas the maximum distance between said curved path (12) and said shaped part's center nearly equals the distance between said groove's bottom and said casing's longitudinal axis.

17. A thermally triggered safety device to automatically shut off the fluid in pipelines according to claim 3, CHARACTERIZED IN THAT said shaped part (11) is designed in a way that said shaped part's (11) twisting inside said first groove (10) is enabled, and an individual curved path (12) located on said shaped part (11) is assigned to each single rib (8), and the minimum distance between said curved path and said shaped part's (11) center is less than half the diameter created by said ribs' (8) edges alongside said casing's longitudinal axis, whereas the maximum distance between said curved path (12) and said shaped part's center nearly equals the distance between said groove's bottom and said casing's longitudinal axis.

18. A thermally triggered safety device to automatically shut off the fluid in pipelines according to claim 4, CHARACTERIZED IN THAT said shaped part (11) is designed in a way that said shaped part's (11) twisting inside said first groove (10) is enabled, and an individual curved path (12) located on said shaped part (11) is assigned to each single rib (8), and the minimum distance between said curved path and said shaped part's (11) center is less than half the diameter created by said ribs' (8) edges alongside said casing's longitudinal axis, whereas the maximum distance between said curved path (12) and said shaped part's center nearly equals the distance between said groove's bottom and said casing's longitudinal axis.

19. A thermally triggered safety device to automatically shut off the fluid in pipelines according to claim 5, CHARACTERIZED IN THAT said shaped part (11) is designed in a way that said shaped part's (11) twisting inside said first groove (10) is enabled, and an individual curved path (12) located on said shaped part (11) is assigned to each single rib (8), and the minimum distance between said curved path and said shaped part's (11) center is less than half the diameter created by said ribs' (8) edges alongside said casing's longitudinal axis, whereas the maximum distance between said curved path (12) and said shaped part's center nearly equals the distance between said groove's bottom and said casing's longitudinal axis.

20. A thermally triggered safety device to automatically shut off the fluid in pipelines according to claim 15, CHARACTERIZED IN THAT said shaped part (11) is designed in a way that said shaped part's (11) twisting inside said first groove (10) is enabled, and an individual curved path (12) located on said shaped part (11) is assigned to each single rib (8), and the minimum distance between said curved path and said shaped part's (11) center is less than half the diameter created by said ribs' (8) edges alongside said casing's longitudinal axis, whereas the maximum distance between said curved path (12) and said shaped part's center nearly equals the distance between said groove's bottom and said casing's longitudinal axis.

21. A thermally triggered safety device to automatically shut off the fluid in pipelines according to claim 20, CHARACTERIZED IN THAT in said maximum distance a peg (13) may be fixed to limit the curved path (12) and said shaped body's (11) twisting movement inside said groove (10), with said rib (8) acting as a limit stop.

* * * * *

UNITED STATES PATENT AND TRADEMARK OFFICE
CERTIFICATE OF CORRECTION

PATENT NO. : 6,279,597 B1  Page 1 of 1
DATED : August 28, 2001
INVENTOR(S) : Klaus Schulze It is certified that error appears in the above-identified patent and that said Letters Patent is hereby corrected as shown below:

Title page,
ABSTRACT, line 16, "dosing" should be -- closing --.

Column 1,
Line 38, "losing" should be -- closing --.

Column 2,
Line 41, "dose" should be -- close --

Signed and Sealed this

Twelfth Day of March, 2002

Attest:

JAMES E. ROGAN
*Attesting Officer*   *Director of the United States Patent and Trademark Office*